United States Patent [19]

Klecker et al.

[11] Patent Number: 4,900,039

[45] Date of Patent: Feb. 13, 1990

[54] TWIN FACE SEAL

[75] Inventors: Brian D. Klecker; Thomas H. Koenig, both of Raleigh, N.C.

[73] Assignee: The Pullman Company, Princeton, N.J.

[21] Appl. No.: 224,693

[22] Filed: Jul. 27, 1988

[51] Int. Cl.[4] .......................... F16J 15/34; F16J 15/40
[52] U.S. Cl. ......................................... 277/27; 277/28; 277/59; 277/65; 277/71; 277/72 R; 277/81 R
[58] Field of Search ................... 277/65, 15, 81 R, 87, 277/85, 71, 72 R, 27, 28, 59

[56] References Cited

U.S. PATENT DOCUMENTS

| 3,127,181 | 3/1964 | Crego et al. | 277/65 X |
| 3,416,808 | 12/1968 | Voitik | 277/87 X |
| 3,539,270 | 11/1970 | Derrickson | 277/15 X |
| 3,591,188 | 7/1971 | Eisner | 277/15 X |
| 4,268,232 | 5/1981 | Haupt | 277/65 X |
| 4,299,398 | 11/1981 | Wahl | 277/65 |
| 4,669,735 | 6/1987 | Sundberg et al. | 277/278 |
| 4,759,554 | 7/1988 | Kemp et al. | 277/65 |

Primary Examiner—Allan N. Shoap
Attorney, Agent, or Firm—Russell E. Baumann

[57] ABSTRACT

A redundant seal arrangement employs first and second face-type seal assemblies for sealing between a housing and rotary member. A drain passage communicates with an intermediate area disposed between the first and second seal assemblies. During normal operation, minute amounts of fluid migrate past the first seal assembly and communicate with the passage to the drain. Alternatively, if the first seal assembly fails, a drain valve closes or a restriction orifice is used so that the intermediate area is raised to essentially the working pressure and the second seal assembly seals against further migration of the working fluid.

6 Claims, 3 Drawing Sheets

TWIN FACE SEAL

BACKGROUND OF THE INVENTION

This invention pertains to the art of face-type mechanical seals and more particularly to sealing rotating shafts.

The invention is particularly applicable to sealing a power takeoff shaft in an aircraft engine assembly and will be described with particular reference thereto. However, it will be appreciated that the invention has broader applications and may be advantageously employed in other rotary pump, turbine, or rotary shaft environments and applications.

Face-type mechanical seals are well known and widely used in the industry for sealing rotating shafts under a variety of conditions. Extreme temperatures and pressure ranges can be satisfied with the basic design of a face-type seal merely by altering the types of materials and without straying from the basic design concept of the seal assembly.

By way of example, the assignee of the subject application provides four basic designs of low pressure and high pressure face seals for both normal and extended operating length. Pressure differentials ranging from 0 to 10 PSI or from 0 to 500 PSI can be accommodated without departing from the basic structure of a groove defined in a stationary housing having a wave spring disposed in the base of the groove. A washer is received in the groove and a first surface thereof cooperates with the wave spring. A second face of the washer is operatively engaged by a seal member having a cutout region that accommodates an O-ring for sealing between the seal member and an axially extending surface of the housing groove. The wave spring urges a face of the seal member into operative sealing engagement with the face of a rotary member.

Although face-type seals of this general construction have met with substantial commerical success, certain industries have strict tolerance and sealing requirements due to the nature of the environment. Prior art arrangements have been deemed unable to adequately satisfy these requirements in a simple manner that still maintains ease of manufacture and testing.

The subject invention provides a twin face seal arrangement that meets all of the basic needs of the industry and overcomes the noted objections in a simple, economical manner.

SUMMARY OF THE INVENTION

According to the present invention, there is provided a seal arrangement that is designed for efficient redundant sealing or back-up sealing if a first seal assembly fails.

According to the invention, a rotary fluid apparatus includes rotor adapted for selective rotation about an axis in a housing. A generally annnular first seal member engages a face of rotor and a generally annular second seal member engages the same rotor face at an area disposed radially inward thereof.

According to a more limited aspect of the invention, both the first and second seal members are biased toward engagement with the face of the rotor.

According to a more limited aspect of the invention, a flow passage communicates with a region disposed between the seal members to receive fluid that leaks past the first seal member.

According to yet another aspect of the invention, a means is disposed in the flow passage and adapted to restrict flow in response to a predetermined pressure change in said region.

A principal advantage of the invention resides in the simplified redundant structure which is compact in design.

Yet another advantage of the invention is found in the ease of manufacture of the seal assemblies.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof, and wherein.

DETAILED DESCRIPTION OF THE PREFERRED EMBODIMENT

Figure 1:
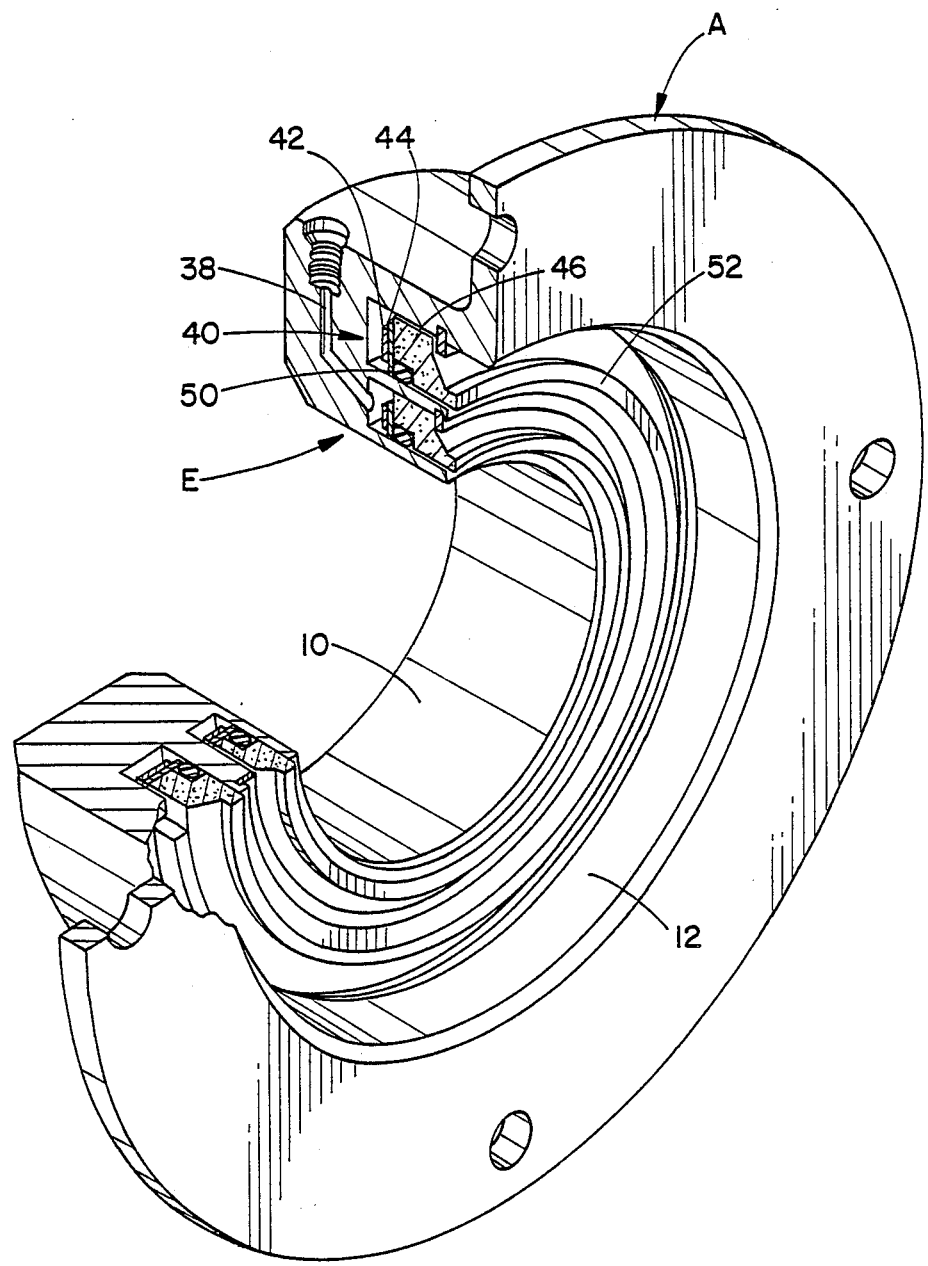
FIG. 1 is a perspective view of a portion of a housing with selected portions cut away in order to illustrate mounting of a subject new twin face seal assembly therein.

Referring now to the drawings wherein the showings are for purposes of illustrating the preferred embodiment of the invention only and not for purposes of limiting same, the FIGURES show a housing A adapted to receive a rotating shaft B therethrough. A rotor C is secured to the shaft for rotation therewith in a working chamber D and sealed relative to the housing by the subject new twin face seal arrangement E.

More particularly, the housing includes a central bore 10 that receives the shaft B therethrough. A concentric counterbore 12 is dimensioned to receive the rotor therein for rotation relative to the housing.

Spaced radially outward from a rotational axis 1 of the shaft and extending axially inward from the counterbore into the housing are concentric first and second grooves 16, 18. The first or radially outer groove includes a generally radially extending bottom wall 20 interconnecting second and third axially extending parallel sidewalls 22, 24. Likewise, the second or radially inner groove includes a generally radially extending bottom wall 30 and axially extending sidewalls 32, 34. The bottom wall of the inner groove has a passage 38 communicating therewith for reasons which will become more apparent hereinbelow.

A first or primary seal assembly 40 is received in the first groove 16. The primary seal assembly includes a biasing means such as wave spring 42 that is interposed between the bottom wall 20 and a washer 44. The wave spring abuttingly engages a first or rear face of the washer and a second or front face of the washer abuttingly engages, in turn, a rear portion of seal member 46. The rear portion of the seal member includes a cutout or stepped region 48 along a radially inner portion thereof adapted to receive a resilient seal element such as O-ring 50.

An axially outer portion of the seal member 46 has a reduced cross-sectional area 52 adapted for sealing engagement with a first or rear face 54 of the rotor. This area 52 is designed selectively to provide optimum sealing force by providing hydraulic balancing explained more fully below. The O-ring 50 maintains a sealing engagement between the seal member 46 and the inner sidewall 24 of the first groove. There is, though, a slight radial gap defined between the first seal assembly and the outer sidewall 22. In this manner, fluid from the working chamber can assist the wave spring in urging the seal member into engagement with the rotor. Simultaneously, the reduced cross-sectional area 52 of the seal member relative to the rear portion thereof produces a counterforce on the seal member that provides for selective and controlled hydraulic balance thereby limiting excessive face contact pressure with the rotor.

A second or redundant/back-up seal assembly 60 is received in the second groove 18. The second seal assembly also includes a biasing means such a wave spring 62 that extends between the bottom wall 230 and a rear face of washer 64. Likewise, a seal member 66 engages a radially outer portion of the front face of the washer and includes a cutout or stepped region 68 that receives a seal element such as elastomeric O-ring 70. A reduced cross-sectional area 72 is adapted for operative engagement with the rear face 54 of the rotor at an area disposed radially inward from the first seal member 46. The area 72 would likewise be selectively designed for optimum hydraulic seal balance.

The second seal assembly operates in substantially the same manner as the first seal assembly. That is, the wave spring engages the washer and urges the seal member into sealing contact with the rear face of the rotor. In a similar manner, the O-ring 70 provides a sealing interface between seal member 66 and sidewall 34 of the second groove. A predetermined radial gap is defined between the second seal assembly and the sidewall 32 of the second groove to permit fluid flow therepast and communicate with the passage 38.

Figure 2:
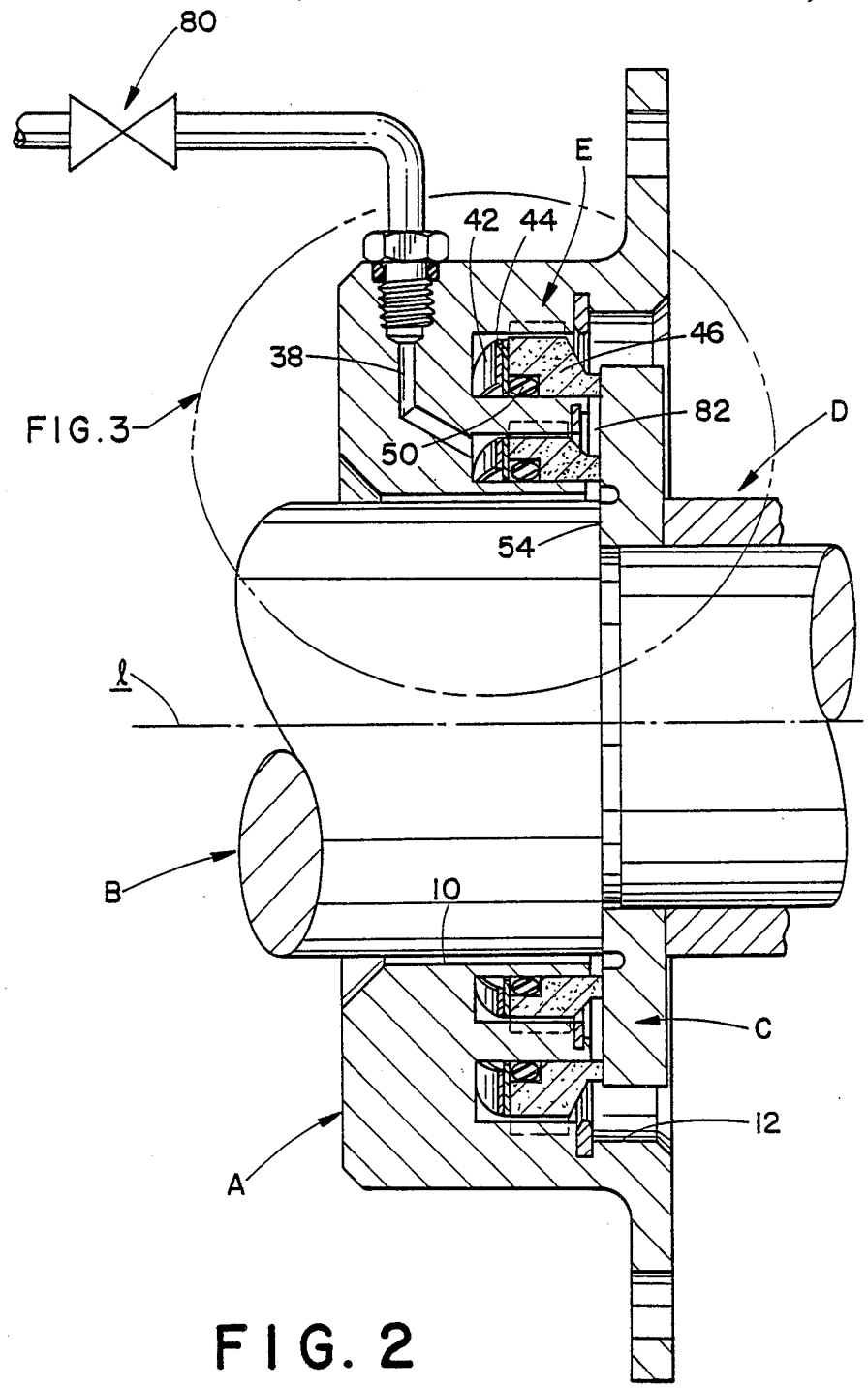
FIG. 2 is a longitudinal cross-sectional view of the housing and a rotor mounted on an associated shaft received therein.
Figure 3:
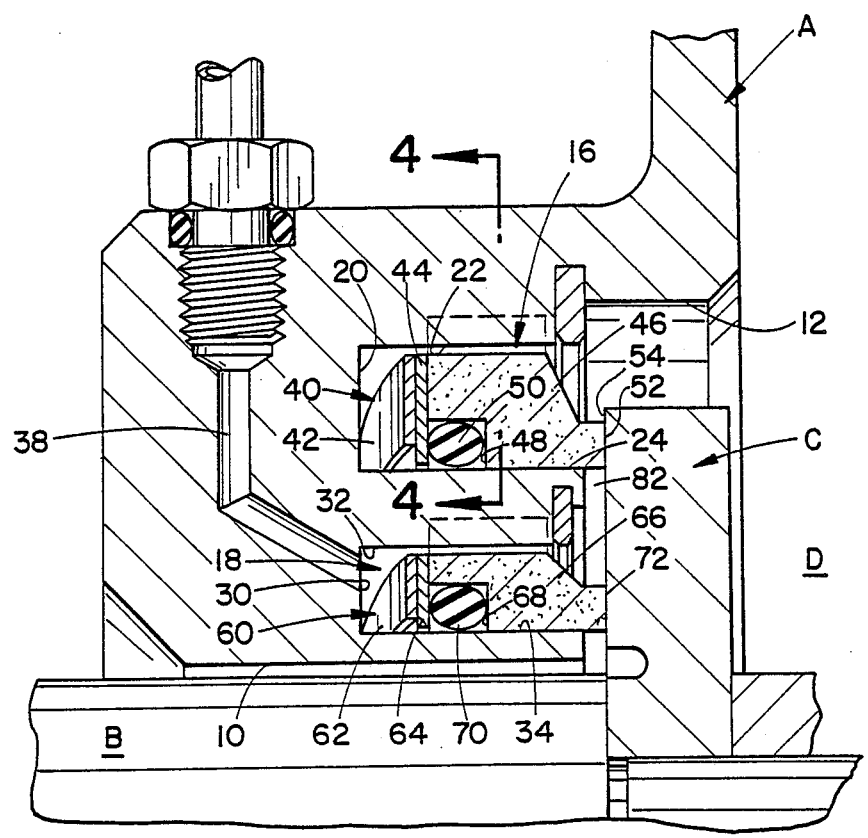
FIG. 3 is an enlarged view of the encircled area of FIG. 2 particularly illustrating details of the seal arrangement; and, FIG. 4 is a cross-sectional view taken generally along the lines 4—4 of FIG. 3 illustrating means for locking the seal assembly against rotation.
Figure 4:
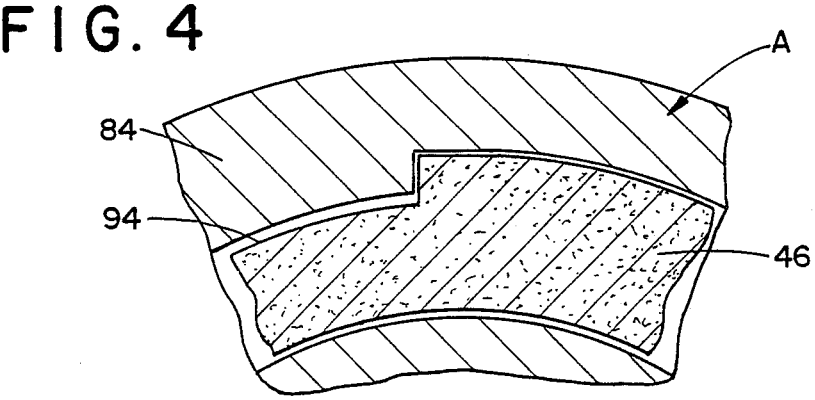

Specifically, the first seal assembly provides the primary seal interface between the housing and the rotor C. Minute amounts of fluid leakage may pass the first seal assembly under normal operating conditions since seal members are not always 100% effective. This minute amount of fluid leakage would, therefore, pass through the predetermined radial gap between the second seal assembly and sidewall 32 for communication with the drain valve passage 38. This minute amount of fluid leakage also offers the advantage of suitably lubricating the second seal assembly 60. Under normal operating conditions, passage 38 is opened and freely communicates through a restrictive means 80 (FIG. 2) such as a check valve or restrictive orifice member.

If the primary seal assembly fails, pressure immediately builds up at an intermediate area 82 disposed between the first and second seal assemblies. This increase in pressure communicates through the passage 38 to the drain restrictor 80. Thus, the second seal assembly effectively seals the rear face of the rotor even if the primary seal assembly fails.

According to a modified arrangement, the intermediate area 82 is maintained at a higher pressure than chamber D. Although parameters of the seal assemblies would have to be revised to accommodate the reversal in pressure direction resulting from maintaining the intermediate area at an elevated pressure, the overall concept of utilizing first and second seal assemblies in a concentric relationship to seal along the same plane, i.e. on a rear face of rotor C remains the same.

Lastly, in the first seal (see FIG. 8) key or flange 84 extends radially inward into groove 16 to lock the seal members against rotation relative to the housing. More specifically, the key is not circumferentially continuous and is received in respective radial recess 94 of the seal member. A similar flange would be used in the second seal which would be received in the radial recess. The key/recess arrangement does not restrain axial movement of the seal members but only limits rotation relative to the housing. Of course, one skilled in the art will realize that other suitable rotational locking arrangements can be used without departing from the overall scope and spirit of the invention. For example, the keys could be defined on the seal members and the slots or keyways defined in the housing depending on the strength of the seal member material.

The invention has been described with reference to the preferred embodiment. Obviously modifications and alterations will occur to others upon a reading and understanding of this specification. For example, alternate face-type seal arrangements could be utilized without departing from the overall concept of a twin face seal arrangement coupled with a drain passage that selectively closes upon failure of the primary seal assembly. This invention is intended to include all such modifications and alterations insofar as they come within the scope of the appended claims or the equivalents thereof.

Having thus described the invention, it is now claimed:

1. A sealing apparatus adapted for sealing a rotary fluid member having a rotor adapted for selective rotation about an axis in a housing comprising:
    a generally annular first seal member having a first portion sealingly engaging said rotor;
    first means for biasing said first seal member toward said rotor, said first biasing means being interposed between said housing and first seal member;
    a generally annular second seal member located in an annular cavity in said housing having a first portion sealingly engaging said rotor, said second seal member disposed radially inward said axis from said first seal member;
    second means for biasing said second seal member toward said rotor and away from said cavity, said second biasing means being interposed between said housing and second seal member;
    a flow passage in said housing communicating with a region defined between said first and second seal assemblies and within said cavity, said flow passage adapted to receive fluid that leaks past said first seal assembly; and
    a restriction means disposed in said flow passage, said restriction means selectively restricting flow in said flow passage in response to a change in pressure in said region upon failure or said first seal member thereby providing pressure needed in said cavity for effective operation of said second seal member.

2. The apparatus as defined in claim 1 in which said restriction means is a check valve.

3. The apparatus as defined in claim 1 further comprising first means for locking said first seal member against rotation in said housing and a second means for locking said second seal member against rotation in said housing.

4. The apparatus as defined in claim 1 wherein said housing includes first and second concentric grooves facing axially toward said rotor and receiving said first and second seal members therein, respectively said second groove defining said cavity.

5. The apparatus as defined in claim 1 wherein said first and second seal members each include a cutout defined along a radially inner portion and receiving third and fourth seal members therein, respectively.

6. The apparatus as defined in claim 1 further comprising a washer interposed between said first seal member and first biasing means.

* * * * *